(No Model.)
R. N. BOSTON.
Combined Corn Planter and Fertilizer Distributer.
No. 232,444. Patented Sept. 21, 1880.
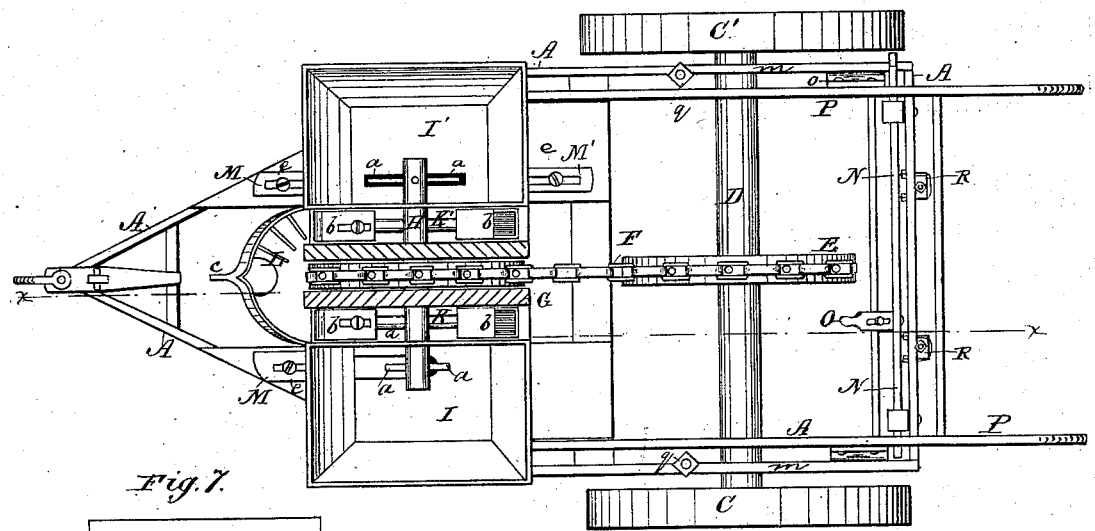
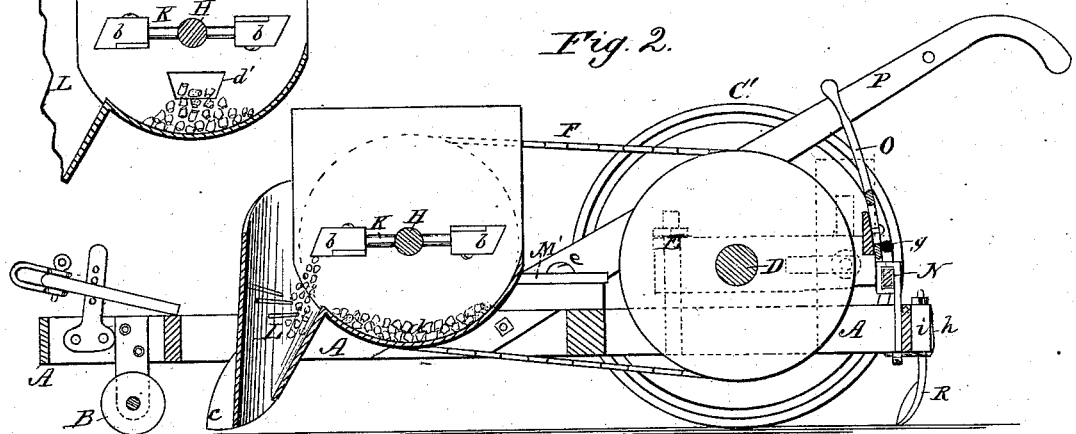
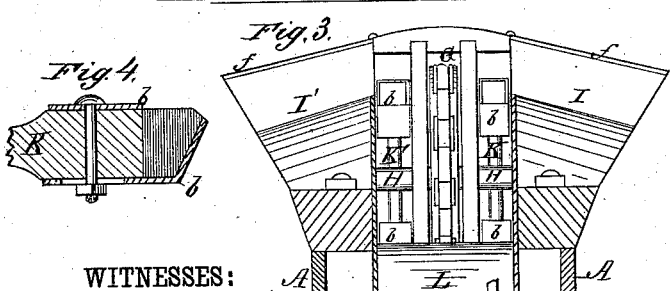
WITNESSES:
W. W. Hollingsworth
Solon C. Kemon
INVENTOR:
Robt. N. Boston
BY
ATTORNEYS.

UNITED STATES PATENT OFFICE.

ROBERT N. BOSTON, OF CHESTERTOWN, MARYLAND.

COMBINED CORN-PLANTER AND FERTILIZER-DISTRIBUTER.

SPECIFICATION forming part of Letters Patent No. 232,444, dated September 21, 1880.

Application filed July 20, 1880. (No model.)

*To all whom it may concern:*

Be it known that I, ROBERT N. BOSTON, of Chestertown, in the county of Kent and State of Maryland, have invented a new and Improved Combined Corn-Planter and Fertilizer-Distributer; and I do hereby declare that the following is a full, clear, and exact description of the same.

My invention is an improvement in the class of machines adapted for simultaneously dropping and covering corn and guano or other fertilizer. The corn and guano are placed in separate hoppers, between which is a rotating wheel whose shaft or axis projects into the respective hoppers, and is provided with teeth that agitate and assist the discharge of the contents of the hoppers. The latter deliver corn and guano, respectively, into separate pockets or receptacles, from which they are taken up by cups affixed to the ends of radial arms projecting from and revolving with the aforesaid axis. The said pockets and revolving arms are between the hoppers, and a seed-spout is located in front of the pockets, so that the seed and fertilizer are delivered simultaneously into the same, and thereby mingled and conveyed into the furrow.

The construction and arrangement of the parts of the machine are more particularly as hereinafter described, reference being had to accompanying drawings, forming part of this specification.

Figure 1 is a plan view of my machine. Fig. 2 is a longitudinal section on line *x x*, Fig. 1. Fig. 3 is a vertical cross-section. Figs. 4, 5, 6, 7 are detail views.

The iron frame A of the machine is approximately triangular in form, and supported upon a roller, B, at the front end and wheels C C' at the rear end. The wheels C C' are mounted fast on an axle, D, from which the rear end of said frame A is suspended, and on the middle portion of the axle is fixed a chain-wheel, E. An endless chain, F, runs on this wheel E and on a corresponding wheel, G, which is mounted on an axis, H, whose ends project laterally through the inner sides of the respective corn and fertilizer hoppers I I', which are placed opposite each other, or side by side, at points about equidistant between the ends of frame A. The ends of said axis H are provided with radial fingers *a*, which, when the axis rotates, stir the contents of the hoppers I I', and thus facilitate the discharge through the slots in the bottom of the hoppers. Radial arms K K', having cups *b* affixed to their ends, are secured to the axis H between the chain-wheel G and hoppers I I'.

As the machine is drawn forward the rotation of the transporting-wheels C C' causes a like movement of axle B and chain-wheel E, so that the chain F transmits rotary motion to the wheel G and shaft H, and thereby causes rotation of the arms K K'. The cups *b* on the ends of the latter take up a quantity of corn and fertilizer and deliver it into the spout L at each rotation of the axis H, and the spout conveys the same into the furrow opened by its point or plow *c*. To enable this operation to take place in the required manner, I provide pockets *d* in the space between the wheel G and hoppers I I', into which the corn and fertilizer discharge through lateral openings *d'*, Fig. 7, in the sides of the hoppers. Said pockets have a curved bottom, and as the arms K K' make their rotary sweep the cups *b* take up the corn and fertilizer and drop them into the flaring mouth of the spout L, at whose rear edge the bottoms of the pockets *d* abruptly terminate.

By this construction and arrangement of parts the pockets are constantly supplied with corn and fertilizer, and the cups *b* are filled at each rotation, so that the quantity deposited in the furrow is not varied, whether the hoppers be full or partly full. The spout is so located and its mouth flares or opens so widely as to adapt it to receive both the corn and fertilizer, which mingle as they descend, and in that condition are delivered into the furrow and covered by the soil.

The quantity of corn and fertilizer discharged from the hoppers I I' in a given time may be limited by the slotted gages or slides M and M', which may be secured in any adjustment by means of thumb-nuts *e*. Said slides may be adjusted so as to entirely cut off the discharge, as is obviously requisite when the machine is at rest or traveling from place to place.

The cups *b* embrace or partly inclose the ends of the arms K K', and are adapted to slide thereon by means of slats and screws, Fig. 4. The cups $b$ may therefore be adjusted so as to take up larger or smaller quantities of corn and fertilizer, as required. The hoppers I I' have hinged lids $f$, and the sheet-metal cover or top of the pockets is provided with slides (not shown) that cover openings, through which convenient access may be had to the arms K K' for the purpose of adjusting the cups $b$.

When it is desired to momentarily arrest the discharge of corn and fertilizer—as, for instance, when the machine is being turned at the end of the field—I lock the wheels C C' immovably, and thus arrest the rotation of the wheel G and arms K K'. This is effected by means of the sliding rod N and lever O. The rod slides horizontally in keepers affixed to the rear end of the frame A, and the lever is pivoted to it and to a fixed fulcrum on the cross-bar that connects the handles P of the machine.

By operating the lever O the rod N is shifted so that it will enter a hole, $g$, in the side of the wheel C', and thus hold it fixed until the lever shall be shifted in the opposite direction.

In order to hold the lever in such position that the rod O will not accidentally lock the wheels C C', a spiral spring (not shown) is employed, it being attached to the upper end of the lever O and one of the handles P. The lever O is slotted longitudinally to allow and compensate for the adjustment of the bars $m$ relative to frame A.

The corn and fertilizer deposited in the furrow are covered by shares or small plows R, attached to the rear end of frame A. The shanks of said plows are secured by means of a clamp, $h$, a block, $i$, and a yoke or cross-bar. This device allows the plows R to be easily and quickly shifted laterally and clamped in a new position.

The plows may be caused to enter the earth to a greater or less depth, in order to cause them to throw more or less earth on the corn and fertilizer. To this end I make the rear end of frame A vertically adjustable, and by the following-described means: The axle D of wheels C C' passes through horizontal bars $m$, from which the frame A is suspended by means of screw-rods $n$ and slotted bars $o$, the latter being secured to bars $m$ by screws $p$, which pass through the slots in said bars. By adjusting the nuts $q$ on the upper ends of rods $n$ and the thumb-nuts $r$, which are applied to the screws $p$, the frame A may be adjusted higher or lower, as required.

The fertilizer is sometimes in a lumpy condition, and in order that the lumps may be broken up I provide cross-bars in the right-hand side of the spout L, as shown in Figs. 1 and 2.

I do not claim, broadly, hoppers having a side delivery, nor hoppers having two compartments with a common delivery and spout or conveyer through which the seed is conducted into the furrow; and I am also aware that seed has been taken up and deposited in a spout by means of rotating arms attached to a rotating shaft and provided with devices for holding the seed; and I further disclaim a device operated by a lever and adapted to lock with the wheels of a planter for the purpose of arresting its rotation temporarily.

What I claim is—

1. The two seed and fertilizer hoppers I I', having discharge-openings in their inner sides, the seed and fertilizer pockets located beneath said openings, the revolving arms carrying seed-cups, and the rotating chain-wheel placed between them, and the spout L, arranged in front of both pockets and adapted to receive the seed and fertilizer simultaneously and to convey them mingled into the same furrow, all as shown and described.

2. The combination, with the axle D and frame A, of the horizontal slotted bars $m$, through which the former passes, the vertical slotted bars O, permanently attached to said frame, and clamp-bolts $p$, and vertical adjusting-screws $n$, all as shown and described.

3. The combination of the pivoted lever O, slotted as shown, and the sliding rod N, working in keeper attached to the frame A, with the wheel having hole $g$, the axle on which the wheel is fixed, and the main frame A, and vertically-adjustable bars $m$ $m$, through which the axle passes, all as shown and described.

ROBERT N. BOSTON.

Witnesses:
WM. C. A. THOMPSON,
J. J. DUGAN.